United States Patent
Smyth et al.

(10) Patent No.: US 9,183,889 B1
(45) Date of Patent: Nov. 10, 2015

(54) DISK DRIVE HAVING A TOP COVER CHANNEL VENTED TO A CENTRAL CAVITY VIA A HOLE THROUGH A BOTTOM LAND

(71) Applicant: Western Digital Technologies, Inc., Irvine, CA (US)

(72) Inventors: Nicholas D. Smyth, San Jose, CA (US); David K. Myers, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/666,168

(22) Filed: Mar. 23, 2015

(51) Int. Cl.
  *G11B 19/20* (2006.01)
  *G11B 33/14* (2006.01)
  *G11B 33/02* (2006.01)

(52) U.S. Cl.
  CPC ........ *G11B 33/1466* (2013.01); *G11B 19/2036* (2013.01); *G11B 33/02* (2013.01)

(58) Field of Classification Search
  CPC .............................. G11B 19/20; G11B 19/2036
  USPC ....................... 360/99.21, 99.15, 99.19, 99.08
  See application file for complete search history.

(56) References Cited

U.S. PATENT DOCUMENTS

| | | | |
|---|---|---|---|
| 5,030,260 A | 7/1991 | Beck et al. | |
| 5,235,482 A | 8/1993 | Schmitz | |
| 5,307,222 A | 4/1994 | Dion | |
| 5,367,417 A | 11/1994 | Brown et al. | |
| 5,417,743 A | 5/1995 | Dauber | |
| 5,481,420 A | 1/1996 | Cardona et al. | |
| 5,754,365 A | 5/1998 | Beck et al. | |
| 5,877,915 A | 3/1999 | Ishida | |
| 5,997,614 A | 12/1999 | Tuma et al. | |
| 6,046,889 A | 4/2000 | Berding et al. | |
| 6,052,890 A | 4/2000 | Malagrino, Jr. et al. | |
| 6,061,206 A | 5/2000 | Foisy et al. | |
| 6,088,190 A | 7/2000 | Anderson | |
| 6,101,876 A | 8/2000 | Brooks et al. | |
| 6,128,159 A | 10/2000 | Ino | |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,214,070 B1 | 4/2001 | Crowder et al. | |
| 6,215,616 B1 | 4/2001 | Phan et al. | |
| 6,266,207 B1 * | 7/2001 | Iwahara et al. | 360/99.18 |
| 6,272,694 B1 | 8/2001 | Knoth | |

(Continued)

OTHER PUBLICATIONS

Nicholas D. Smyth, et al., U.S. Appl. No. 14/666,184, filed Mar. 23, 2015, 27 pages.

*Primary Examiner* — Allen T Cao

(57) ABSTRACT

A disk drive has a disk drive base with a central cavity surrounded by a peripheral wall. The disk drive also includes a top cover attached to the disk drive base and disposed over the central cavity to define a disk drive enclosure. A disk is rotatably attached to the disk drive base within the central cavity, and is disposed within the disk drive enclosure. The top cover has a central top face that defines a central top face plane. A foil seal is adhered to the central top face. The central top face of the top cover includes a first channel that has a bottom land that is depressed towards the disk relative to the central top face plane, and the foil seal covers the first channel. The first channel is vented to the central cavity by a hole through the bottom land of the first channel.

18 Claims, 6 Drawing Sheets

(56) References Cited

U.S. PATENT DOCUMENTS

| | | |
|---|---|---|
| 6,285,524 B1 | 9/2001 | Boigenzahn et al. |
| 6,287,350 B1 | 9/2001 | Tucholski |
| 6,288,866 B1 | 9/2001 | Butler et al. |
| 6,292,333 B1 | 9/2001 | Blumentritt et al. |
| 6,296,691 B1 | 10/2001 | Gidumal |
| 6,344,950 B1 | 2/2002 | Watson et al. |
| 6,349,464 B1 | 2/2002 | Codilian et al. |
| 6,388,873 B1 | 5/2002 | Brooks et al. |
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,475,269 B1 | 11/2002 | Turner |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,221 B2 | 9/2003 | Gillis et al. |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,644,362 B2 | 11/2003 | Bernett |
| 6,646,821 B2 | 11/2003 | Bernett et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,683,747 B2 | 1/2004 | Bernett |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,785,082 B2 | 8/2004 | Fiorvanti et al. |
| 6,785,089 B2 | 8/2004 | Bernett et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,819,517 B2 | 11/2004 | Fioravanti et al. |
| 6,824,595 B2 | 11/2004 | Ueki et al. |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,043 B2 | 5/2005 | Fioravanti |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,914,742 B1 | 7/2005 | Fioravanti et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,972,927 B2 | 12/2005 | Hong et al. |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 6,999,262 B2 | 2/2006 | Han et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,920 B2 | 6/2006 | Fujiwara et al. |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |

(56) References Cited

U.S. PATENT DOCUMENTS

| | | |
|---|---|---|
| 7,092,251 B1 | 8/2006 | Henry |
| 7,099,099 B1 | 8/2006 | Codilian et al. |
| 7,113,371 B1 | 9/2006 | Hanna et al. |
| 7,130,149 B2 | 10/2006 | Hong et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,199,963 B2 | 4/2007 | Fukushima |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,974 B2 | 9/2007 | Fukuyama et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,398,590 B1 | 7/2008 | Mann et al. |
| 7,408,737 B2 | 8/2008 | Fukushima et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,570,455 B2 * | 8/2009 | Deguchi et al. ............ 360/99.21 |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,821,735 B1 * | 10/2010 | Bogacz et al. ............. 360/99.21 |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |

(56) References Cited

U.S. PATENT DOCUMENTS

| | | |
|---|---|---|
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 2003/0089417 A1 | 5/2003 | Bernett |
| 2005/0092178 A1 | 5/2005 | Lim et al. |
| 2006/0044675 A1 | 3/2006 | Fukushima et al. |
| 2008/0212237 A1 | 9/2008 | Uefune et al. |
| 2008/0310048 A1 | 12/2008 | Hirono et al. |
| 2011/0212281 A1 | 9/2011 | Jacoby et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

\* cited by examiner

DISK DRIVE HAVING A TOP COVER CHANNEL VENTED TO A CENTRAL CAVITY VIA A HOLE THROUGH A BOTTOM LAND

CROSS REFERENCE TO RELATED APPLICATION(S)

This application is related to co-pending U.S. patent application Ser. No. 14/666,184 filed on Mar. 23, 2015, entitled "DISK DRIVE HAVING A TOP COVER CHANNEL VENTED TO A CENTRAL CAVITY VIA A PERIPHERAL CLEARANCE GAP," to Nicholas D. Smyth, which is hereby incorporated by referenced in its entirety.

BACKGROUND

The typical hard disk drive includes a head disk assembly (HDA) and a printed circuit board assembly (PCBA) attached to a disk drive base of the HDA. The HDA includes at least one disk (such as a magnetic disk, magneto-optical disk, or optical disk), a spindle motor for rotating the disk, and a head stack assembly (HSA). The PCBA includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which disks are mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The HSA typically includes an actuator, at least one head gimbal assembly (HGA), and a flex cable assembly. During operation of the disk drive, the actuator must rotate to position the HGAs adjacent desired information tracks on the disk. The actuator includes a pivot-bearing cartridge to facilitate such rotational positioning. The pivot-bearing cartridge fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, to form a voice coil motor. The PCBA provides and controls an electrical current that passes through the actuator coil and results in a torque being applied to the actuator.

Each HGA includes a head for reading and writing data from and to the disk. In magnetic recording applications, the head typically includes a slider and a magnetic transducer that comprises a writer and a read element. In optical recording applications, the head may include a mirror and an objective lens for focusing laser light on to an adjacent disk surface. The slider is separated from the disk by a gas lubrication film that is typically referred to as an "air bearing." The term "air bearing" is common because typically the lubricant gas is simply air. However, air bearing sliders have been designed for use in disk drive enclosures that contain helium, because an inert gas may not degrade lubricants and protective carbon films as quickly as does oxygen. Helium may also be used, for example, because it has higher thermal conductivity than air, and therefore may improve disk drive cooling. Also, because the air bearing thickness depends on the gas viscosity and density, the air bearing thickness may be advantageously reduced in helium relative to air (all other conditions being the same). Furthermore, because helium has lower density than air, its flow (e.g. flow that is induced by disk rotation) may not buffet components within the disk drive as much, which may reduce track misregistration and thereby improve track following capability—facilitating higher data storage densities.

Disk drive enclosures disclosed in the art to contain helium are typically hermetically sealed in an attempt to prevent an unacceptable rate of helium leakage. Although some negligible amount of helium leakage is unavoidable, a non-negligible amount of helium leakage is undesirable because it can alter the thickness of the gas lubrication film between the head and the disk, and thereby affect the performance of the head. A non-negligible amount of helium leakage is also undesirable because it can alter the tribochemistry of the head disk interface, possibly leading to degradation in reliability, head crashes, and associated data loss.

Certain disk drives that contain air may include a small opening in the disk drive enclosure to allow a limited flow of air from the outside environment, for example through a labyrinth path and/or a breather filter, to equalize the internal air pressure within the disk drive with the outside air pressure. However, certain other disk drives that contain air may be hermetically sealed, with the disk drive enclosure under some stress to maintain super-ambient or sub-ambient pressure within the disk drive.

Various methods and structures have been disclosed in the past to hermetically seal disk drive enclosures. Some of these have been too costly, have required too much change to existing disk drive manufacturing processes, and/or were not able to retain helium internal to the disk drive enclosure for sufficient time to ensure adequate product reliability. Others have made rework of disk drives (after assembly) difficult or impractical, or had structural problems such as blistering of flexible seals due to gas pressure within the disk drive enclosure being temporarily or permanently super-ambient or sub-ambient.

Thus, there is a need in the art for a disk drive design that may be practically hermetically sealed in a high volume and low cost manufacturing process, and/or that can retain air, helium, or another gas internal to a disk drive enclosure for a sufficient period of time to ensure adequate post-manufacture product reliability and lifetime. There is also a need in the art for a disk drive design that may better resist excessive seal blistering and/or other structural problems that may result from the gas pressure within the disk drive being or becoming different from the gas pressure outside of the disk drive enclosure.

DETAILED DESCRIPTION OF EXAMPLE EMBODIMENTS

Figure 1:
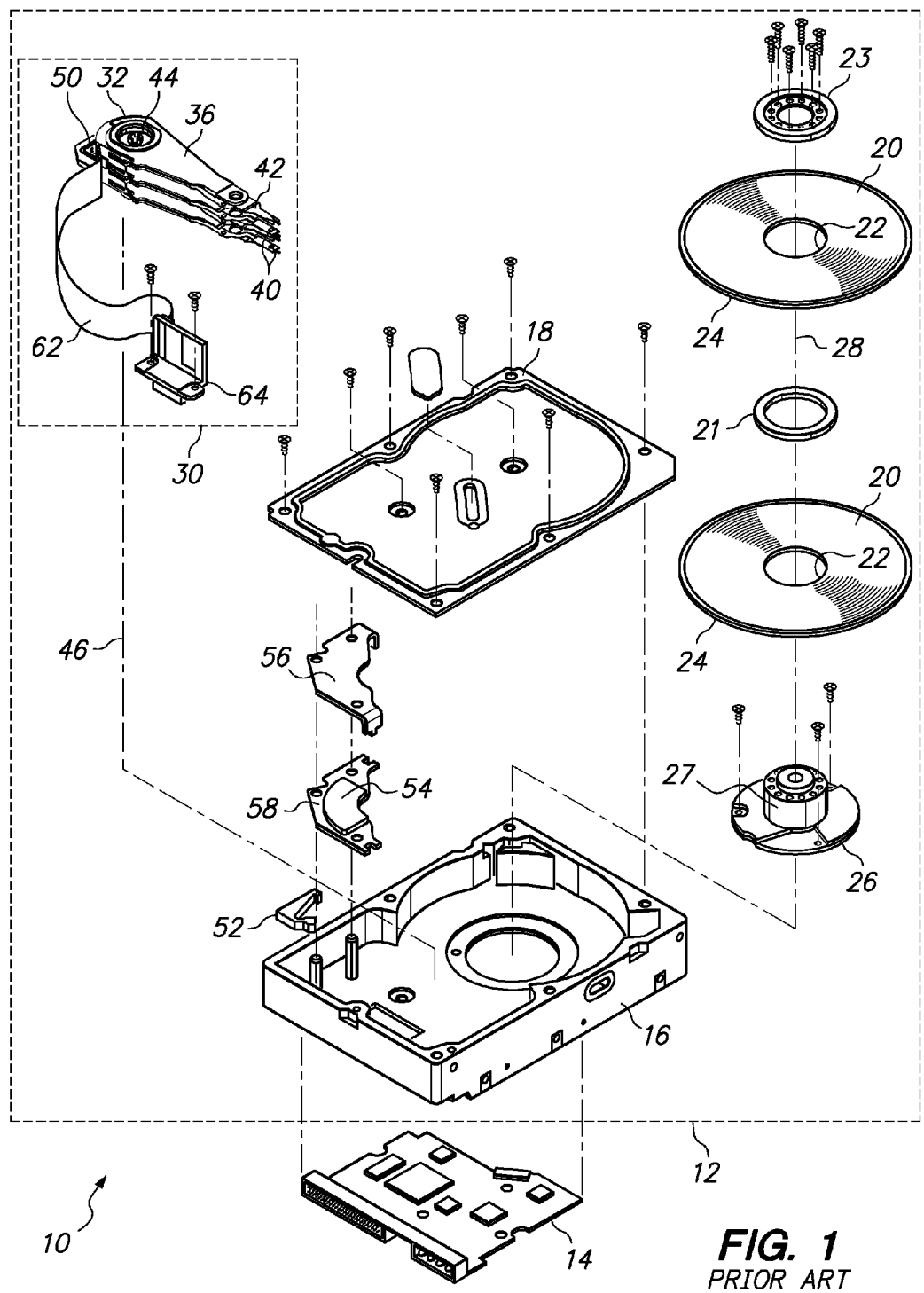
FIG. 1 is an exploded perspective view of a disk drive according to the prior art.

FIG. 1 is an exploded perspective view of a disk drive 10 according to the prior art. The disk drive 10 includes a head disk assembly (HDA) 12 and a printed circuit board assembly (PCBA) 14. The HDA 12 includes a disk drive base 16 and cover 18 that together house disks 20. Each of the disks 20 may contain a plurality of concentric tracks for storing data, disposed upon its opposing disk major surfaces between an inner radial extent 22 and an outer radial extent 24.

In the example of FIG. 1, a rotary spindle 26 is attached to the disk drive base 16 of the HDA 12, and may include a disk mounting hub 27 upon which the disks 20 may be mounted. The rotary spindle 26 rotates the disks 20 about a disk axis of rotation 28. The disks 20 may be stacked and separated with one or more annular disk spacers 21, and clamped to the disk mounting hub 27 by a disk clamp 23. The HDA 12 further includes a head stack assembly (HSA) 30 pivotably attached to the disk drive base 16 of HDA 12 by use of a pivot bearing cartridge 44 that is engaged within a bore of an actuator body 32. The pivot bearing cartridge 44 may facilitate the HSA 30 to rotate relative to HDA 12 about an actuator pivot axis 46.

One or more actuator arms 36 may extend from the actuator body 32, and one or more head gimbal assemblies (HGA) 42 may be attached to a distal end of each actuator arm 36. Each HGA 42 may include a head 40 for reading and writing data from and to an adjacent disk surface. The HSA 30 may further include a coil 50. The coil 50 may interact with one or more magnets 54 attached to disk drive base 16 via a yoke structure 56, 58, to form a voice coil motor for controllably rotating the HSA 30. The HDA 12 also optionally includes a latch 52 pivotably mounted on the disk drive base 16 to limit the rotational movement of the HSA 30.

In the example of FIG. 1, the PCBA 14 may include a servo control system for generating servo control signals to control the current through the coil 50 and thereby position the HSA 30 relative to concentric tracks disposed upon the surfaces of disks 20. The HSA 30 may be electrically connected to PCBA 14 via a flex cable 62 and a flex cable support bracket 64 that attaches to the disk drive base 16.

Figure 2:
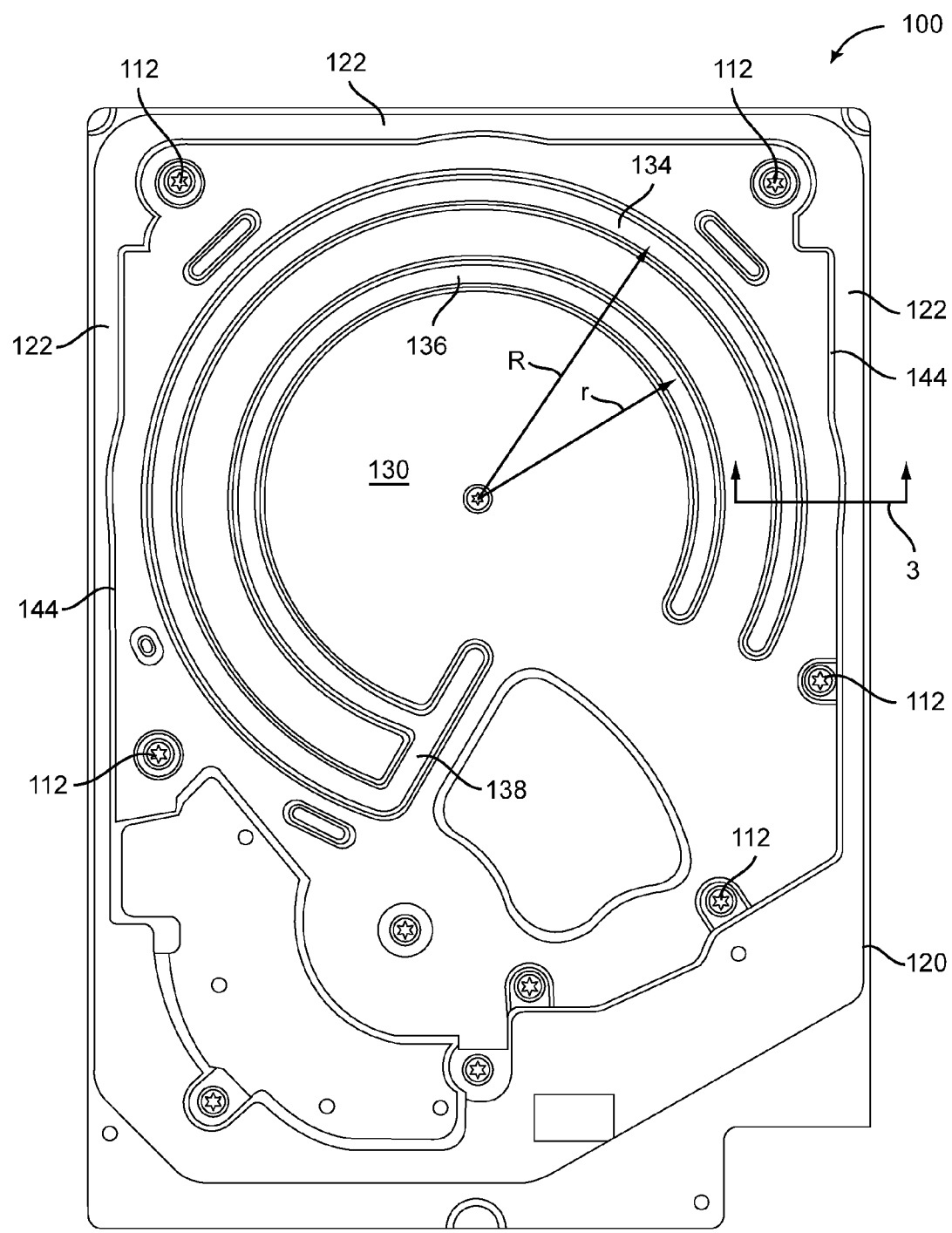
FIG. 2 is a plan view of a disk drive with its foil seal removed to reveal features of the top cover, showing the general location of the cross-sectional views of FIGS. 3A-E.

FIG. 2 is a plan view of a disk drive 100, which includes a disk drive enclosure that includes a disk drive base 120, and a top cover 130. The disk drive 100 also includes a foil seal, but the foil seal is not shown in FIG. 2, so that features of the top cover 130 and the peripheral top face 122 of the disk drive base 120 can be seen.

FIGS. 3A-3E are cross-sectional views of a portion of the disk drive 100, including a foil seal 150. FIG. 2 shows the location 3 of the cross-section of FIGS. 3A-3E. Now referring to FIGS. 2-3E, the disk drive base 120 includes a central cavity 140 surrounded by a peripheral wall 124 and bounded by a cavity floor 142. The peripheral wall 124 has a peripheral top face 122. The top cover 130 is disposed over the central cavity 140 to define a disk drive enclosure. The top cover 130 has a central top face (e.g. adjacent to the label 130) that defines a central top face plane 131. An outer periphery of the top cover 130 optionally may be spaced from the peripheral wall 124 of the disk drive base 120 by a peripheral clearance gap 144 that defines a gap width P that is preferably but not necessarily in the range of 0.1 mm to 1 mm.

A disk 320 is rotatably attached to the disk drive base 120 within the central cavity 140 and disposed within the disk drive enclosure formed by the disk drive base 120 and the top cover 130. The foil seal 150 is adhered to the central top face of the top cover 130, and optionally also to the peripheral top face 122 of the disk drive base 120 (with the foil seal 150 spanning the peripheral clearance gap 144). The foil seal 150 may be adhered to the central top face of the top cover 130 by an adhesive that may optionally comprise a conventional acrylic pressure sensitive adhesive layer having a thickness in the range 10 to 100 microns. Such an adhesive may permit removal of the foil seal 150 for disk drive rework that may become necessary during or after disk drive manufacture, while otherwise retaining helium within the disk drive 100 for a sufficient period to ensure adequate post-manufacture product reliability and lifetime.

The foil seal 150 may optionally include a continuous metal foil, and a continuous adhesive layer coating the underside of the continuous metal foil. In the present context, a metal foil is considered continuous if it is one contiguous and monolithic foil sheet, rather than an assembly of previously separate sub-regions. The foil seal 150 may be a pure metal or metal alloy foil that includes copper, aluminum, tin, and/or gold, preferably having a metal foil thickness in the range 2 to 100 microns. Alternatively, the foil seal 150 may comprise a stainless steel foil having a thickness in the range 2 to 40 microns. Such thickness ranges may advantageously allow the foil seal 150 to be flexible enough to seal, and also have adequate robustness to avoid damage from disk drive handling. Alternatively, but not necessarily, the foil seal 150 may comprise a thin metal coating sputtered upon a polymer backing sheet.

Figure 3A:
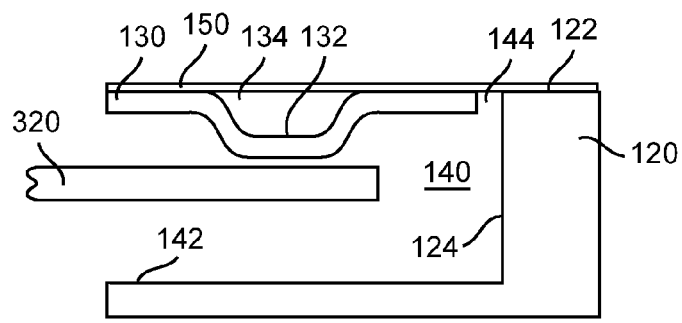
FIG. 3A is a cross-sectional view of a portion of a disk drive, with foil seal in place.
Figure 3B:
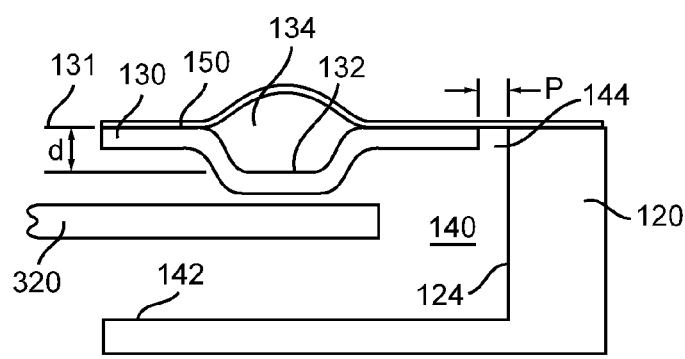
FIG. 3B depicts the cross-section of FIG. 3A, with the foil seal blistering over a channel in the top cover, because of a drop in external pressure.

As shown in FIG. 3B, the central top face of the top cover 130 may include an outer channel 134 that is depressed towards the disk 320 relative to the central top face plane 131 by a top cover channel depth d that is preferably but not necessarily in the range of 0.3 mm to 3 mm. The foil seal 150 covers the outer channel 134. As shown in FIG. 2, the outer channel 134 optionally follows an arcuate path that defines an outer arcuate radius R that is preferably but not necessarily less than or equal to 38 mm. The central top face of the top cover 130 may further include an optional inner channel 136 that is depressed towards the disk 320 relative to the central top face plane 131. The central top face of the top cover 130 may further include an optional connecting channel 138 that is depressed towards the disk 320 relative to the central top face plane 131.

In the example of FIG. 2, the inner channel 136 may follow an arcuate path that is concentric with the arcuate path of the outer channel 134. The arcuate path of the inner channel 136 may define an inner arcuate radius r that is optionally less than the radius R of the outer channel 134. The inner arcuate radius r may preferably but not necessarily be greater than or equal to 15 mm. The connecting channel 138 preferably but not necessarily connects the inner channel 136 to the outer channel 134.

Figure 3C:
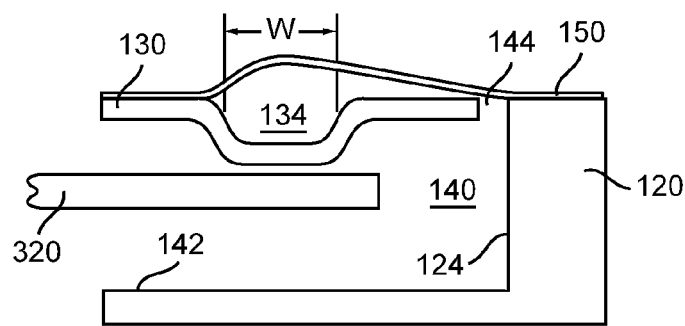
FIG. 3C depicts the cross-section of FIG. 3B, after the blister has undesirably delaminated a region of the foil seal to vent to a central cavity of the disk drive enclosure.
Figure 3D:
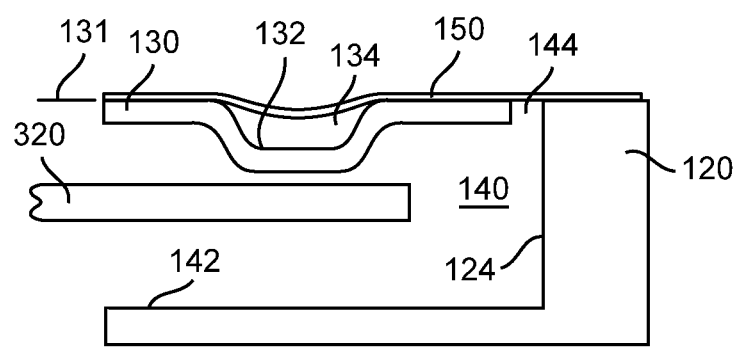
FIG. 3D depicts the cross-section of FIG. 3C, after the foil seal has re-adhered to the disk drive top cover adjacent the channel after venting.
Figure 3E:
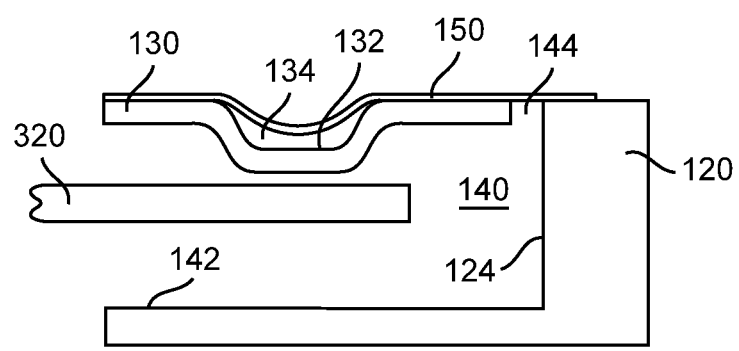
FIG. 3E depicts the cross-section of FIG. 3D, with foil seal tension and undesirable lateral displacement of the foil seal due to a subsequent increase in external pressure.

In the example of FIGS. 2-3E, the top cover 130 is attached to the disk drive base 120 by a plurality of screw fasteners 112. The foil seal 150 preferably covers the plurality of screw fasteners 112. The foil seal 150 is preferably not adhered to a bottom land 132 of the outer channel 134, but spans the outer channel 134 to enclose a volume of gas (e.g. air, helium, etc).

The outer channel 134 defines a channel width W that is preferably but not necessarily in the range of 1 mm to 20 mm.

The enclosure of the disk drive 100 optionally may be helium-filled (i.e. the central cavity 140 may optionally enclose a substantial concentration of helium gas). Practically, the concentration of enclosed helium gas (e.g. versus remaining air) would be less than 100% initially, and would be expected to drop over the useful life of the disk drive 100. Still, the disk drive 100 may be considered "helium-filled" throughout its useful life so long as it continues to enclose a substantial concentration of helium gas. Note also that 1.0 atmosphere pressure of helium is not required for the disk drive 100 to be considered "helium-filled." For example, a helium-filled disk drive enclosure may initially enclose helium having between 0.3 to 1.0 atmosphere partial pressure, and may also enclose air having between 0 to 0.7 atmosphere partial pressure. In certain applications, it may be desirable for at least 70% of the helium gas that is initially enclosed to remain enclosed after a 10 year useful life of the hermetically sealed disk drive.

FIGS. 3A-E are related by depicting the same structure at sequentially later instances in time. For example, in FIG. 3B, the foil seal 150 is blistering over the outer channel 134 of the top cover 130, because of a drop in external pressure relative to that assumed in FIG. 3A. In FIG. 3C the blister in the foil seal 150 has undesirably delaminated a region of the foil seal 150 from adhering to the top cover 130, so that the gas trapped in the blister can vent to the central cavity 140 of the disk drive enclosure. In FIG. 3D, the foil seal 150 has re-adhered to the disk drive top cover 130 adjacent the outer channel 134, after venting. Finally, in FIG. 3E the foil seal 150 is subjected to tension and undesirable lateral displacement due to a subsequent increase in external pressure relative to that assumed in FIG. 3C.

The delamination of the foil seal 150 that is depicted in FIG. 3C, and the displacement of the foil seal 150 that is depicted in FIG. 3E, are undesirable because they can lead to wrinkles and creases in the foil seal 150 that may allow an undesirable rate of leakage. Hence, certain preferred embodiments of the present invention include structure to permit venting of the outer channel 134, without the venting path requiring blistering or delamination of the foil seal 150.

Figure 4A:
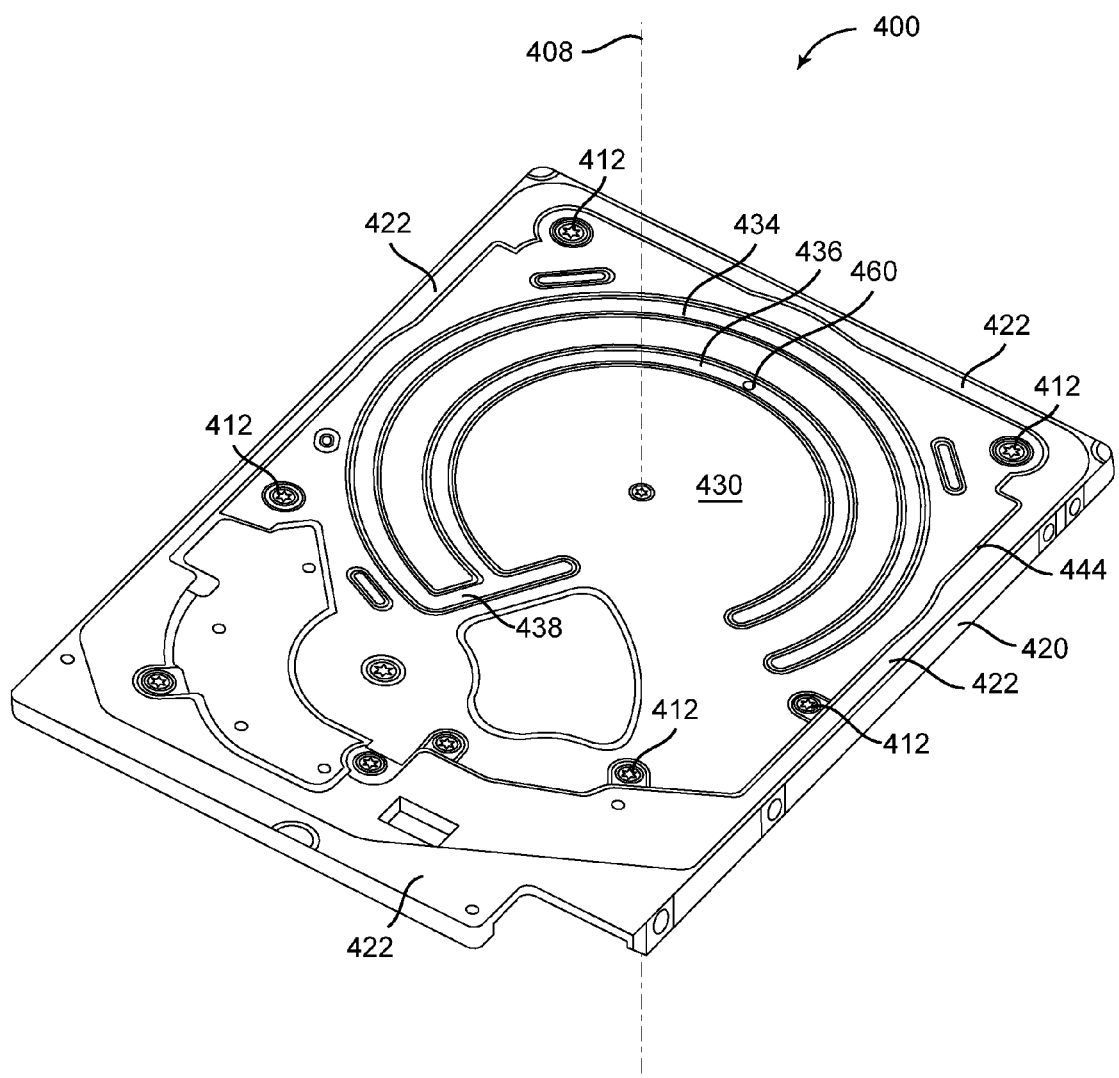
FIG. 4A is a perspective view of a disk drive with its foil seal removed to reveal features of the top cover, which is capable of being sealed according to an embodiment of the present invention.
Figure 4B:
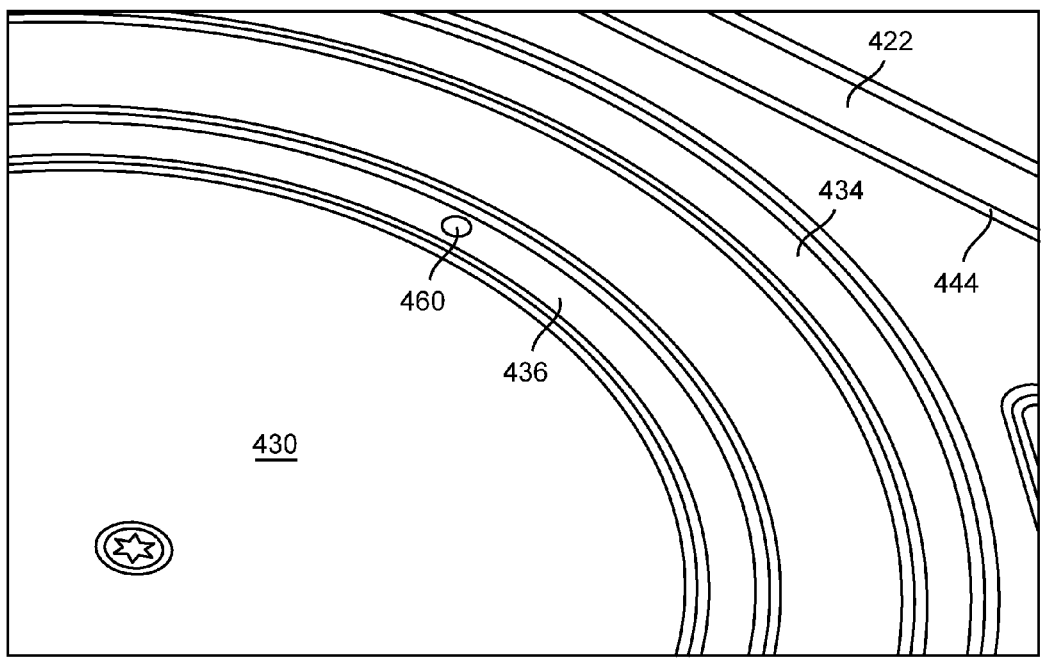
FIG. 4B is a zoomed in view of a portion of the disk drive of FIG. 4A.

For example, FIG. 4A is a top perspective view of a disk drive 400 with its foil seal removed, that is capable of being sealed according to an embodiment of the present invention. FIG. 4B is a zoomed in view of a portion of the disk drive 400. The disk drive 400 includes a disk drive enclosure that includes a disk drive base 420, and a top cover 430. The disk drive 400 also includes a foil seal, but the foil seal is not shown in FIGS. 4A and 4B, so that features of the top cover 430 and the peripheral top face 422 of the disk drive base 420 will not be obscured.

In the embodiment of FIGS. 4A and 4B, an outer periphery of the top cover 430 optionally may be spaced from the peripheral top face 422 of the disk drive base 420 by a peripheral clearance gap 444. As shown in FIG. 4A, the central top face of the top cover 430 may include an outer channel 434 that is depressed inwardly into the disk drive enclosure that is formed by the top cover 430 and the disk drive base 420. The outer channel 434 optionally follows an arcuate path about an axis of rotation of an underlying disk, with such arcuate path defining an outer arcuate radius that is preferably but not necessarily less than or equal to 38 mm. However, non-arcuate paths for the outer channel 434 are also contemplated herein.

In the embodiment of FIGS. 4A and 4B, the central top face of the top cover 430 may further include optional inner and connecting channels 436 and 438 that are depressed inwardly into the disk drive enclosure that is formed by the top cover 430 and the disk drive base 420. The inner channel 436 may optionally follow an arcuate path about an axis of rotation of an underlying disk, which is concentric with the arcuate path of the outer channel 434. However, non-arcuate inner channels are also contemplated herein. In the embodiment of FIGS. 4A and 4B, the arcuate path of the inner channel 436 may define an inner arcuate radius that is optionally less than the radius of the outer channel 434. The inner arcuate radius may preferably but not necessarily be greater than or equal to 15 mm. The connecting channel 438 preferably but not necessarily connects the inner channel 436 to the outer channel 434.

In the embodiment of FIGS. 4A and 4B, the outer and inner channels 434, 436 may be vented to a central cavity of the disk drive base 420 by a hole 460 through a bottom land of the inner channel 436. Alternatively or in addition, the outer and inner channels 434, 436 may be vented to a central cavity of the disk drive base 420 by a hole through a bottom land of the outer channel 434. Alternatively or in addition, the outer and inner channels 434, 436 may be vented to a central cavity of the disk drive base 420 by a hole through a bottom land of the connecting channel 438. In this way, gas in the outer and inner channels 434, 436 can be vented to the central cavity (e.g. to equalize pressure), via the hole 460 to permit venting of the outer and inner channels 434, 436 without the venting path requiring blistering or delamination of an overlying foil seal.

In the embodiment of FIGS. 4A and 4B, the hole 460 is round and may preferably but not necessarily have a hole diameter in the range of 0.3 mm to 2 mm. However, holes of other than circular shape are also contemplated herein. In certain embodiments, the hole 460 may prevent or reduce the undesirable delamination and/or displacement of an overlying foil seal that is depicted in FIGS. 3C and 3E.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms. "Preferably" is used herein to mean preferably but not necessarily.

We claim:

1. A disk drive comprising:
    a disk drive base comprising a central cavity surrounded by a peripheral wall; and
    a top cover attached to the disk drive base and disposed over the central cavity to define a disk drive enclosure, the top cover having a central top face that defines a central top face plane;
    a disk rotatably attached to the disk drive base within the central cavity and disposed within the disk drive enclosure; and
    a foil seal adhered to the central top face;
    wherein the central top face of the top cover includes a first channel that has a bottom land that is depressed towards the disk relative to the central top face plane,
    wherein the foil seal covers the first channel,
    and wherein the first channel is vented to the central cavity by a hole through the bottom land of the first channel.

2. The disk drive of claim 1 wherein the bottom land of the first channel is depressed towards the disk relative to the central top face plane by a top cover channel depth in the range of 0.3 mm to 3 mm.

3. The disk drive of claim 1 wherein the foil seal comprises a metal selected from the group consisting of copper, aluminum, and stainless steel.

4. The disk drive of claim 1 wherein the disk drive enclosure is helium-filled.

5. The disk drive of claim 4 wherein the helium-filled enclosure encloses helium having between 0.3 to 1.0 atmosphere partial pressure.

6. The disk drive of claim 5 wherein the helium-filled enclosure also encloses air having between 0 to 0.7 atmosphere partial pressure.

7. The disk drive of claim 1 wherein the foil seal includes a metal coating on a polymer backing layer.

8. The disk drive of claim 1 wherein the disk defines an axis of disk rotation, and the first channel follows a first arcuate path about the disk axis of rotation that defines a first arcuate radius.

9. The disk drive of claim 8 wherein the central top face of the top cover further includes a second channel that is depressed towards the disk relative to the central top face plane, the second channel following a second arcuate path about the disk axis of rotation that is concentric with the first arcuate path.

10. The disk drive of claim 9 wherein the central top face of the top cover further includes a third channel that is depressed towards the disk relative to the central top face plane, the third channel connecting the second channel to the first channel.

11. The disk drive of claim 1 wherein the first channel defines a first channel width in the range of 1 to 20 mm.

12. The disk drive of claim 8 wherein the first arcuate radius is in the range of 15 mm to 38 mm.

13. The disk drive of claim 1 wherein the hole is round and has a hole diameter in the range of 0.3 mm to 2 mm.

14. The disk drive of claim 1 wherein the foil seal is adhered to the central top face by an adhesive layer that comprises acrylic pressure sensitive adhesive having a thickness in the range 10 to 100 microns.

15. The disk drive of claim 1 wherein the top cover is attached to the disk drive base by a plurality of screw fasteners, and the foil seal covers the plurality of screw fasteners.

16. The disk drive of claim 1 wherein the foil seal is not adhered to the bottom land of the first channel, but spans the first channel to enclose a volume of gas.

17. The disk drive of claim 16 wherein the gas comprises air or helium.

18. The disk drive of claim 16 wherein the gas is vented to the central cavity by the hole.

* * * * *